(No Model.)
D. MINICH.
SPIKE.
No. 464,980. Patented Dec. 15, 1891.
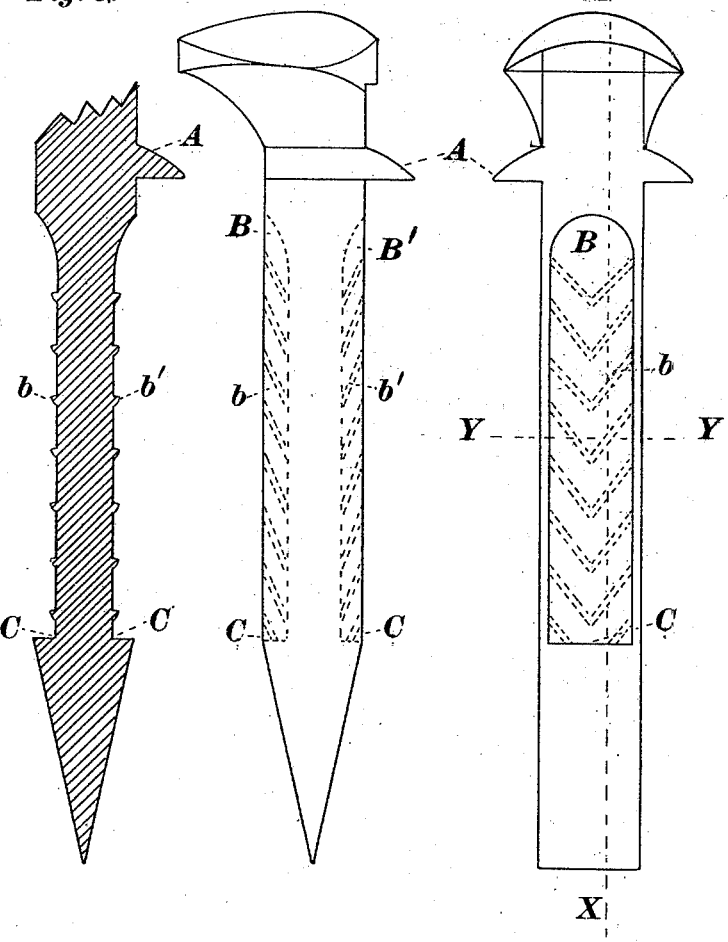
Witnesses
James P. Dolman
Edw. C. Dolman
Inventor
Daniel Minich
by John Dolman, Jr.
Attorney

UNITED STATES PATENT OFFICE.

DANIEL MINICH, OF PHILADELPHIA, PENNSYLVANIA, ASSIGNOR OF TWO-THIRDS TO JOHN YATES AND ROBERTS McKEE, OF SAME PLACE.

SPIKE.

SPECIFICATION forming part of Letters Patent No. 464,980, dated December 15, 1891.

Application filed July 1, 1890. Serial No. 357,404. (No model.)

*To all whom it may concern:*

Be it known that I, DANIEL MINICH, a citizen of the United States, residing at Philadelphia, in the county of Philadelphia and State of Pennsylvania, have invented certain new and useful Improvements in Spikes; and I hereby declare that the following specification, taken in connection with the drawings forming a part of the same, is a clear, true, and exact description of my invention.

The object of my invention is to provide a railroad-spike with means for preventing the same working loose in the ties, that shall hold a rail firmer than an ordinary spike, have a leverage at and be stronger near the head to prevent breaking at that point and spreading of the rails, and that shall embody means for preventing water or other fluid running down the sides of the spike when driven, rusting the same, and rotting the wood around it.

Referring to the drawings, Figure 1 is a front or face view of my improved spike; Fig. 2, a side view of the same; Fig. 3, a portion of a vertical section through the line X X of Fig. 1; Fig. 4, a top view, and Fig. 5 a cross-section through line Y Y of Fig. 1.

A is a projection, shoulder, or, as I term it, a "calk," which extends around three sides of the spike, and when the same is driven lies flat on the surface of the tie or slightly driven into the same, and the upper surface of the calk, being beveled or inclined downward from the body of the spike, sheds water, oil, or other fluid away from the same and the hole in which the same is embedded, the front portion of the spike being effectually protected by the overhanging head and rail, against which it presses.

I am aware that spikes have been made before having an extended head forming a calk to protect the spike and hole from water, and I do not therefore claim, generally, calking the hole; but I claim great advantage from my peculiar form of calk. It takes less material to form it, (an important commercial consideration.) My spike is better balanced—not so top-heavy. The calk can conveniently be made to extend farther from the body of the spike. It has a sloping top, which is more certain to throw the water away from the hole, as it can extend farther back. It offers greater leverage against the spreading of the rail. It is cheaper and lighter, and the calk, being distinct from the head, does not interfere with the use of the claw in withdrawing the spike.

B and B' are grooves of circular-arc cross-section, as shown in Figs. 4 and 5, extending along the front and back of the spike from just below the calk to about the beginning of the bevel of the point. These grooves are cut out square at C, making a shoulder which catches the fiber of the wood and prevents the spike being easily withdrawn. I make these grooves, as shown in Figs. 2 and 3, of generally uniform depth, and, as shown in Fig. 1, of generally uniform width.

I am aware that spikes have been made before with grooves on the face and back, but of different shape from the grooves in my spike. The comparatively large size, uniform depth, and circular-arc cross-section enable the grooves to receive and hold a greater quantity of wood fiber and save greater quantity of metal with less weakening of the spike than any other form, and the shoulder C, pressing squarely against this large body of fiber, holds the spike very firmly, as extended experiment has amply demonstrated.

My spikes when driven are almost impossible of withdrawal, and when the wood is cut I find the grooves are packed tightly with solid wood fiber, firmly connected with the body of the wood, and but little crushed or broken, a result I have obtained with no other form of groove. The quantity of metal taken from the grooves is more than sufficient to form the calk, and the spikes are consequently lighter than the ordinary spikes.

*b b'* are ridges or corrugations within the grooves, which I prefer to use in making my spike, but which can be omitted without seriously impairing its value.

Having thus described my invention, what I claim, and desire to secure by Letters Patent, is—

In a railroad-spike, the combination of a shoulder or calk around the back and two sides of the neck of the spike, distinct from the head, beveled or sloped on the upper side downward from the body of the spike, and two grooves, one in the face and one in the back of the spike, of circular-arc cross-section and substantially uniform depth and width and extending from just below the calk to about the beginning of the point-bevel, the lower terminations thereof cut perpendicularly into the body of the spike to form barbs or shoulders, as shown, described, and for the purpose specified.

DANIEL MINICH.

Witnesses:
WILLIAM C. STOEVER,
JOHN DOLMAN.